United States Patent
Schrot

(10) Patent No.: US 7,516,707 B2
(45) Date of Patent: Apr. 14, 2009

(54) PORTABLE TREE SHELF

(76) Inventor: Joseph Rudolph Schrot, 402 Laurens St., Olean, NY (US) 14760

( * ) Notice: Subject to any disclaimer, the term of this patent is extended or adjusted under 35 U.S.C. 154(b) by 379 days.

(21) Appl. No.: 11/401,976

(22) Filed: Apr. 12, 2006

(65) Prior Publication Data
US 2006/0231707 A1 Oct. 19, 2006

Related U.S. Application Data

(60) Provisional application No. 60/670,649, filed on Apr. 13, 2005.

(51) Int. Cl.
 A47B 5/00 (2006.01)
(52) U.S. Cl. .................. 108/152; 182/187
(58) Field of Classification Search ............ 108/134, 108/135, 149, 97, 98, 152; 182/92, 136, 182/187, 91, 188, 135
See application file for complete search history.

(56) References Cited

U.S. PATENT DOCUMENTS

| 1,984,602 | A | * | 12/1934 | Snyder ............... 248/240.3 |
|---|---|---|---|---|
| 2,356,131 | A | * | 8/1944 | Tracy .................. 108/149 |
| 2,384,101 | A | * | 9/1945 | Kruse .................... 43/55 |
| 2,590,793 | A | * | 3/1952 | Rigstad ................ 211/88.01 |
| 3,392,802 | A | * | 7/1968 | Moore .................. 182/187 |
| 4,113,058 | A | * | 9/1978 | Kobosh ................. 182/187 |
| 4,230,296 | A |  | 10/1980 | Staley et al. |
| 5,156,096 | A |  | 10/1992 | Lamprey |
| 5,301,911 | A |  | 4/1994 | Beauchemin |
| 5,427,344 | A |  | 6/1995 | Beauchemin |
| D369,674 | S |  | 5/1996 | Schreiner et al. |
| 5,706,740 | A |  | 1/1998 | Keller, Jr. |
| 5,732,793 | A | * | 3/1998 | Dech .................... 182/187 |
| 5,769,372 | A | * | 6/1998 | Klosterman ............ 248/219.4 |
| D421,490 | S | * | 3/2000 | Talerico ................ D23/308 |
| 6,196,511 | B1 |  | 3/2001 | Beauchemin |
| 6,205,935 | B1 |  | 3/2001 | Lindaman |
| 6,431,315 | B1 | * | 8/2002 | Lewis .................... 182/92 |
| 6,508,446 | B1 | * | 1/2003 | Addison et al. ......... 248/218.4 |
| 6,581,891 | B1 | * | 6/2003 | Byrd .................... 248/219.4 |
| 6,705,235 | B1 | * | 3/2004 | Gerutto ................. 108/47 |
| 2007/0019348 | A1 | * | 1/2007 | Bhattacharya et al. ..... 361/91.1 |

* cited by examiner

*Primary Examiner*—Janet M Wilkens
(74) *Attorney, Agent, or Firm*—William C. Schrot; Edell, Shapiro & Finnan LLC

(57) ABSTRACT

A portable shelf includes a planar shelf surface, a cleat, and a strap secured to the cleat. The cleat has a first end connected to a rear edge of the shelf surface and a distal second end. The cleat may either be integrally formed with the shelf surface, or pivotally connected thereto. The cleat is substantially perpendicular to the shelf surface in an open position. The strap forms a continuous loop for encircling a support post. The strap is tightenable against the support post, thereby securing the cleat to the support post.

20 Claims, 7 Drawing Sheets

PORTABLE TREE SHELF

CROSS REFERENCE TO RELATED APPLICATION AND CLAIM OF PRIORITY

This application is based on provisional application Ser. No. 60/670,649, filed Apr. 13, 2005, for Joseph Rudolph Schrot, the disclosure of which is incorporated herein by reference and to which priority is claimed under 35 U.S.C. § 120.

FIELD OF THE INVENTION

The present invention is directed to a portable shelf comprising a planar shelf surface, a cleat, and a strap secured to the cleat. The cleat has a first end connected to a rear edge of the shelf surface and a distal second end. The cleat may either be integrally formed with the shelf surface, or pivotally connected thereto. The cleat is substantially perpendicular to the shelf surface in an open position. A plurality of barbs extends outwardly from the cleat and away from the shelf surface. The strap has a first end releasably securable to a second end so that the strap forms a continuous loop for encircling a support post. The strap is tightenable against the support port so that the barbs are forced into the support post thereby securing the cleat to the support post.

SUMMARY OF THE INVENTION

The present invention is directed to a portable tree shelf. It may be used in conjunction with a portable hunting stand, as a camping accessory, etc. For example, a hunter may attach the disclosed shelf to a tree to provide a place for setting binoculars, ammunition, lunch, etc. within easy reach. The invention may also include one or more hooks for hanging gear such as a gun, bow, backpack, etc. In one embodiment, one of the hooks is configured for hanging a bow or gun thereon.

The present invention is directed to a portable shelf comprising a planar shelf surface, a cleat, and a strap secured to the cleat. The cleat has a first end connected to a rear edge of the shelf surface and a distal second end. The cleat is substantially perpendicular to the shelf surface. A plurality of barbs extends outwardly from the cleat and away from the shelf surface. The strap has a first end releasably securable to a second end so that the strap forms a continuous loop for encircling a support post. The strap is tightenable against the support post so that the barbs are forced into the support post thereby securing the cleat to the support post.

The present invention also relates to a portable shelf having a planar shelf surface, a pivotally connected cleat, and a strap secured to the cleat. The cleat has first and second opposite major surfaces, a first end pivotally connected to a rear edge of the shelf surface, and a distal second end. A plurality of barbs extends outwardly from the first major surface of the cleat. The cleat is pivotally moveable between an open position and a closed position. The cleat is substantially perpendicular to the shelf surface in the open position, and the barbs are proximate the planar shelf surface when the cleat is in the closed position. The strap has a first end releasably securable to a second end so that the strap forms a continuous loop for encircling a support post. The strap is tightenable against the support post so that the barbs are forced into the support post thereby securing the cleat to the support post.

The present invention also relates to a portable shelf comprising a shelf surface having a substantially rectangular configuration, and a C-shaped clamp secured to an underside of the shelf surface. The C-shaped clamp has a first end having a flattened surface, a central portion at least partially secured to the underside of the shelf surface, and a second end having a threaded opening. A threaded screw is disposed within and cooperates with the threaded opening so that the screw is moveable within the opening. The screw has a first end moveable toward and away from the flattened surface for clamping an object therebetween.

DETAILED DESCRIPTION OF THE INVENTION

Figure 1:
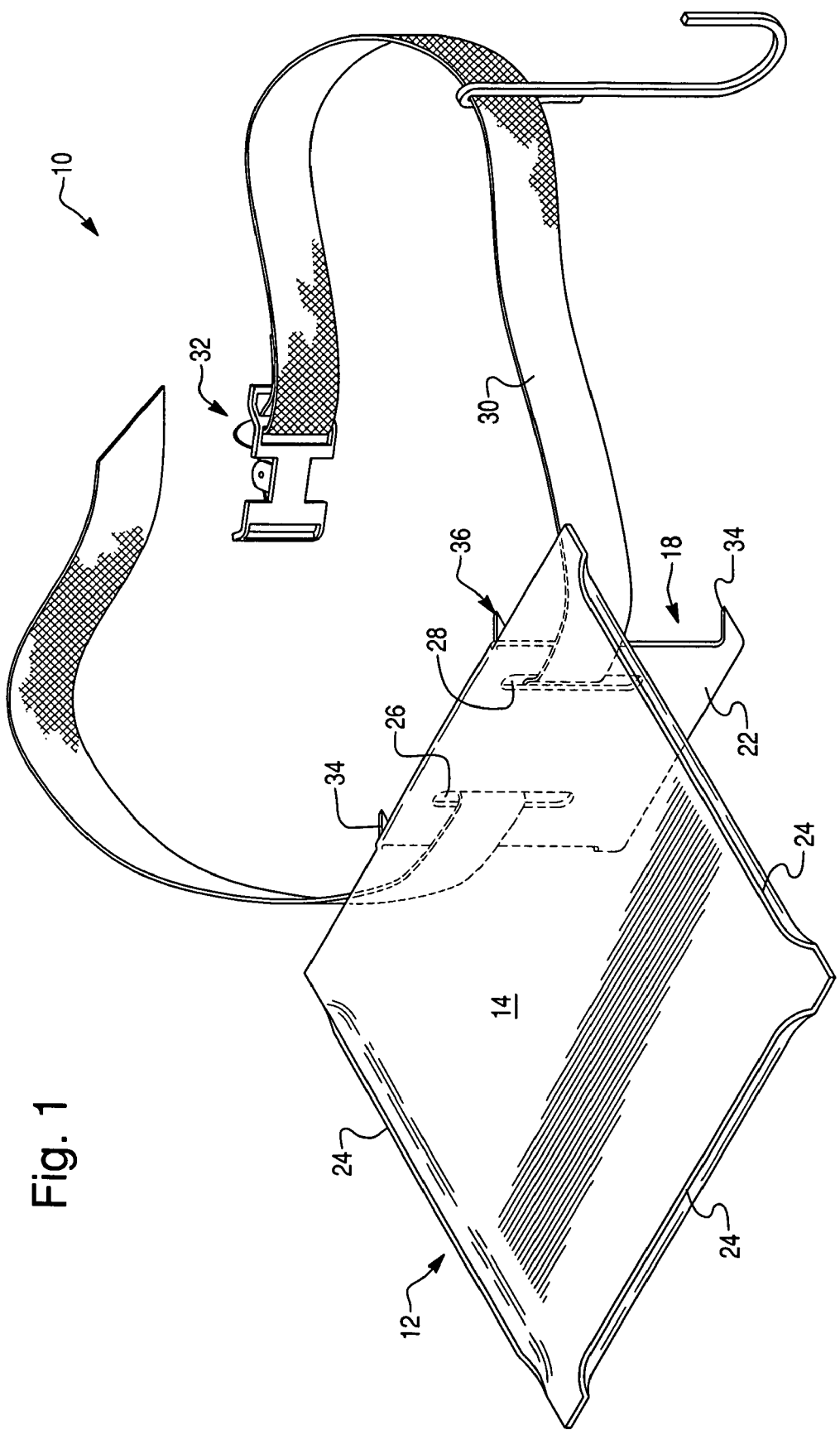
FIG. 1 is a top perspective view of a tree shelf according to an embodiment of the present invention.

A tree shelf 10 according to a first embodiment of the present invention is best shown in FIGS. 1-4. Tree shelf 10 includes a shelf surface 12 having first and second opposite major planar surfaces 14, 16, and a cleat 18 having first and second opposite major surfaces 20, 22. Cleat 18 is angularly disposed relative to shelf surface 12. Preferably, cleat 18 is substantially perpendicular to shelf surface 12. Shelf surface 12 and cleat 18 may be formed from metal, such as sheet metal, aluminum or some other suitable lightweight metal. Alternatively, shelf surface 12 and cleat 18 may be formed from a rigid polymer material. Shelf surface 12 and cleat 14 may be integrally formed from a single piece of material, such as a single piece of sheet metal which has been bent to form shelf surface 12 and cleat 18, or injection molded from a polymer material. Alternatively, cleat 18 may be secured to shelf surface 12, such as by bonding or welding.

The configuration of shelf surface 12 may vary depending on user preference. For example, shelf surface 12 may have a square configuration having a length and width of approximately 6 inches, respectively. However, it should be understood that shelf surface 12 may have some other configuration, such as oval or rectangular, with a surface area either larger or smaller than 6 inches square. Preferably, shelf 10 is sufficiently small so that it may be easily transported in a backpack or coat pocket of a user.

Shelf surface 12 preferably includes raised edges 24 about the periphery thereof. Raised edges 24 minimize the possibility of any items placed on shelf surface 12 from sliding or rolling off. However, raised edges 24 preferably do not extend about the entire periphery. As shown in FIGS. 1-4, raised edges 24 do not extend from corner to corner. Instead, planar shelf surface 12 extends outwardly at the corners thereof. In this way, water or other liquids may easily drain off of shelf surface 12 at the corners.

Shelf surface 12 may have a solid surface, or it may be a grid configuration with openings, which also eliminates any liquid from pooling on shelf surface 12 and provides for lightweight construction. Preferably, both shelf surface 12 and cleat 18 have a dull or matt finish that is non-reflective. Alternatively, shelf surface 12 and cleat 18 may include a camouflage pattern finish. Shelf surface 12 and cleat 18 may also include a coating or finish, such as a polymer layer, which baffles or reduces noise should anything contact shelf surface 12 (such as a cup, ammunition, water dripping from above, etc.).

Figure 3:
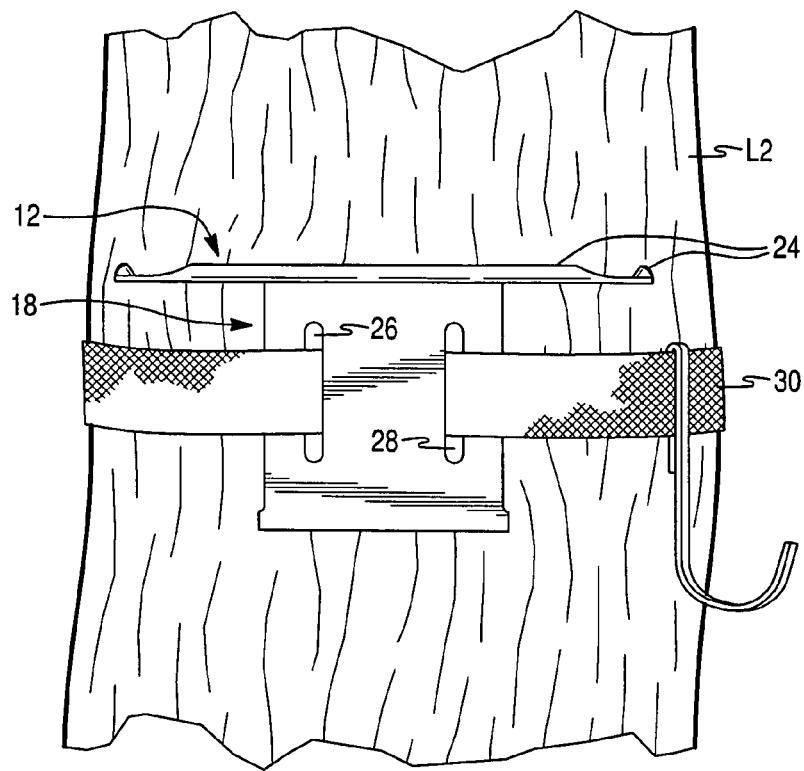
FIG. 3 is an elevational view of the tree shelf shown in FIG. 1 attached to a vertically disposed tree limb.
Figure 4:
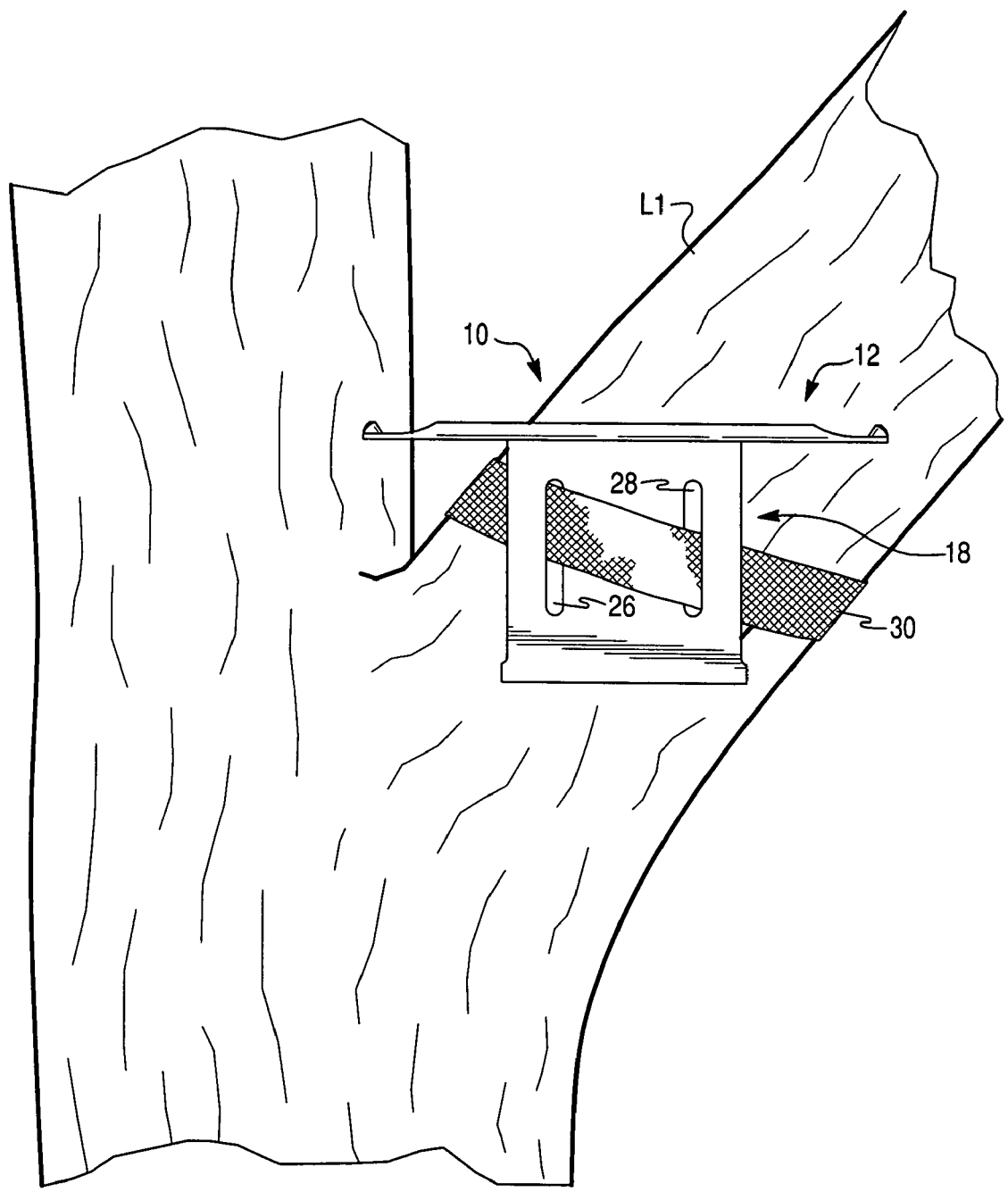
FIG. 4 is an elevational view of the tree shelf shown in FIG. 1 attached to an angularly disposed tree limb.

Cleat 18 preferably includes first and second openings 26, 28 extending therethrough. A strap 30 is fed through first opening 26, across first surface 20 of cleat 18, and out second opening 28, as shown in FIG. 3. Alternatively, strap 30 may be fed through first opening 26, across second surface 22 of cleat 18, and out second opening 28, as shown in FIG. 4. A buckle 32, such as a spring buckle, is secured to one end of strap 30, and releasably secures the opposite free end of strap 30 to form a continuous loop. Buckle 32 may be any metal or plastic buckle which will releasably secure the free end of strap 30. Alternatively, the ends of strap 30 may include male and female cooperating components, or the ends of strap 30 may include a loop and hook type fastener system such as Velcro™. However, the diameter of the resulting loop formed by strap 30 and buckle 32 (or other fastening mechanism) should be adjustable, so that the user can tighten strap 30 against the tree or post. In this way, cleat 18 is releasably secured against the tree or post, thereby releasably securing shelf 10.

Openings 26, 28 preferably have a sufficient width to allow the user to easily slip strap 30 therethrough. Furthermore, openings 26, 28 preferably have a length greater than the width of strap 30. For example, strap 30 may have a width of about 1 inch, and openings 26, 28 may have a length of about 1½ inches. This permits strap 30 to be angular disposed in openings 26, 28 relative to the plane of shelf surface 12, as best shown in FIG. 4. If strap 30 is encircling a non-vertical trunk or limb L1, for example, cleat 18 may still be oriented so that shelf surface 12 is horizontally disposed and level, even if strap 30 is angular disposed around limb L1. Of course, strap 30 may also be positioned around a relatively vertical trunk or limb L2, so that strap 30 is substantially parallel to shelf surface 12, as best shown in FIG. 3. Thus, shelf 10 may be securely attached to either a vertical trunk or limb L2 or a nonvertical trunk or limb L1.

Figure 2:
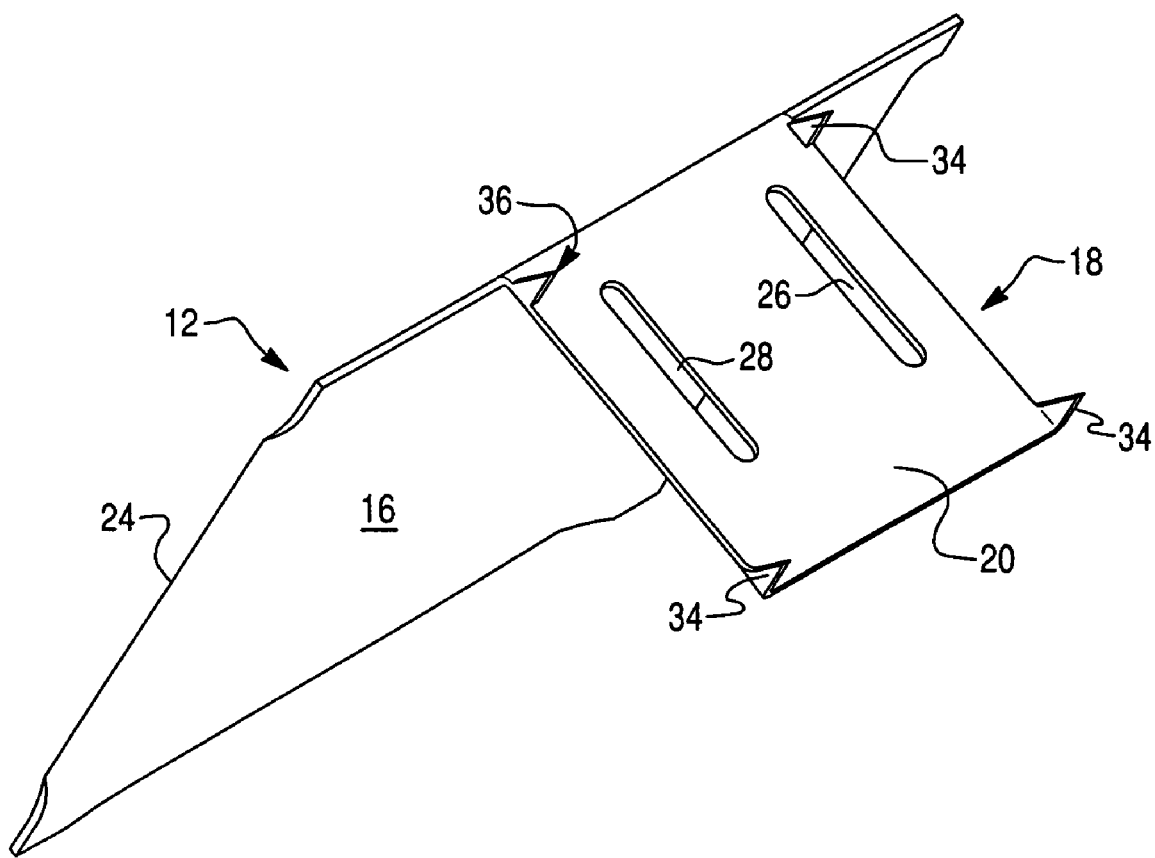
FIG. 2 is bottom perspective view of the tree shelf shown in FIG. 1.

Cleat 18 preferably includes one or more barbs 34, as shown in FIGS. 1 and 2. In one embodiment, four barbs 34 extend outwardly from first surface 20 of cleat 18 proximate the corners thereof, and away from shelf surface 12. Each barb 34 has a sufficient length so that barbs 34 engage the tree bark as cleat 18 is tightened against the tree when strap 30 is tightened, thereby stabilizing shelf 10. For example, barbs 34 may extend outwardly from major surface 20 by about ½ inch. Barbs 34 may have a triangular configuration with pointed tips 36 for engaging the tree bark. Preferably, barbs 34 are not so long, and barb tips 36 are not so sharp, so as to cause permanent damage to the tree. Alternatively, cleat 18 may include pads formed from rubber or the like, which extend outwardly from first surface 20, and grip the tree as cleat 18 is tightened against the tree.

Figure 5:
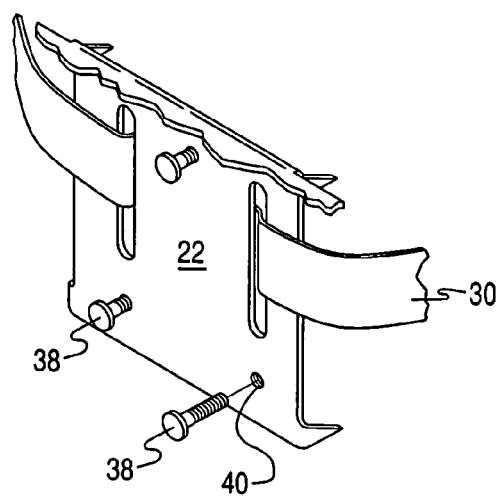
FIG. 5 is a fragmentary perspective view of a tree shelf having a cleat with leveling screws.

Cleat 18 may include one or more leveling screws 38 which screw into corresponding holes 40 extending through cleat 18, as best shown in FIG. 5. Leveling screws 38 screw into corresponding holes 40 so that the tip of the screws 38 brace against the tree when securing cleat 18 thereto. If the surface of the tree is curved and/or uneven so that cleat 18 is not flush against the tree surface, leveling screws 38 act to counterbalance the uneven surface by acting as a brace for cleat 18. However, leveling screws 38 do not screw into the tree to the point of causing damage to the tree. Rather, screws 38 simply act as a brace. As such, leveling screws 38 preferably include a relatively blunt or flattened tip which will not damage the tree or penetrate the bark as leveling screws 38 are screwed into holes 40. Rather, leveling screws 38 push against the bark or tree surface to achieve leveling and stability of shelf 10.

Strap 30 may have any desired length sufficient to encircle a tree or post. For example, strap 30 may have a length of at least about four feet. Preferably, strap 30 has a length sufficient to encircle trees or limbs (or posts) having diameters ranging between about 19 inches to about 3½ inches. Many portable hunting stands accommodate trees having a similar range in diameter. As such, tree shelf 10 may be used in conjunction with a portable hunting stand, and it may be secured to the same tree trunk supporting the portable stand. Alternatively, tree shelf 10 may be secured to a tree or limb within reach of the user.

Preferably, one or more hooks are provided which may be removably secured to strap 30. Strap 30 may include a plurality of spaced holes (not shown) through which an end of the hooks may be inserted and removably secured. Alternatively, the hooks may include an end forming an eyehole through which the strap extends, thereby releasably securing the hooks thereon. Equipment may then be hung from the hook(s) in any desired position relative to the diameter of the tree or limb on which shelf 10 is secured.

Figure 6:
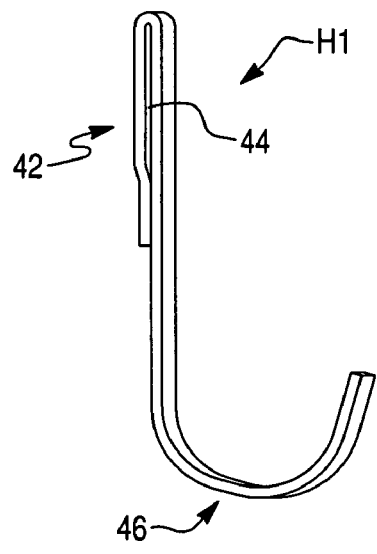
FIG. 6 is a perspective view of a hook having a first configuration suitable for use with the disclosed tree shelf.
Figure 7:
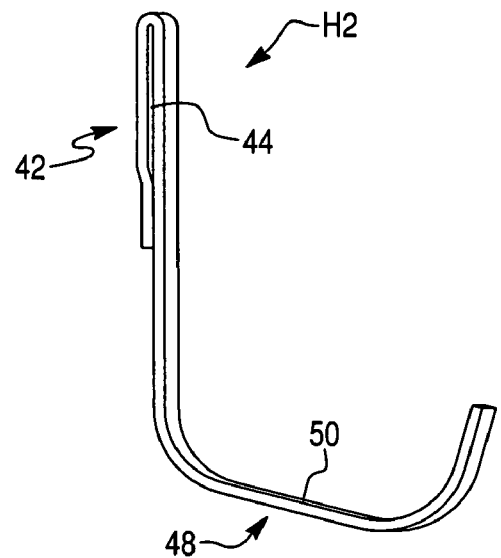
FIG. 7 is a perspective view of a hook having a second configuration suitable for use with the disclosed tree shelf.
Figure 8:
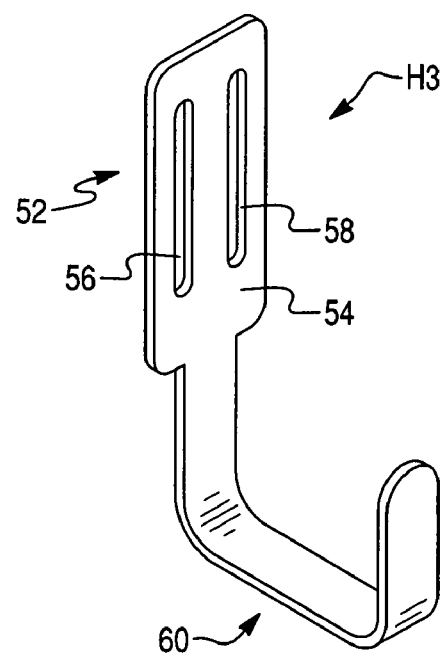
FIG. 8 is a perspective view of a hook having a third configuration suitable for use with the disclosed tree shelf.

As best shown in FIGS. 6-8, the gear hooks may have various configurations. As shown in FIG. 6, hook H1 includes a first end 42 having an eye hole 44 that curves outwardly through which strap 30 may be received, and a U-shaped second end 46 on which equipment may be hung. Hook H1 is preferably formed from metal or other material having sufficient rigidity and strength so that its shape is maintained when equipment, such as a backpack or binoculars, is hung therefrom.

As shown in FIG. 7, hook H2 also includes first end 42 with eye hole 44. However, hook H2 includes an L-shaped second end 48 having a flat central portion 50 configured for receiving a bow or sling of a gun.

As shown in FIG. 8, hook H3 includes a first end 52 having a planar portion 54 with first and second openings 56, 58. Strap 30 may be fed through first opening 56, across planar portion 54, and out second opening 58. Hook H3 includes a U-shaped second end 60 on which equipment may be hung. Second end 60 may also be configured for receiving a bow or sling of a gun.

It should be understood that hooks having different configurations may also be used with the present invention, so long as the hooks may be secured to strap 30. The hooks are also preferably secured to strap 30 snugly enough to prevent them from slipping off strap 30 and falling to the ground, but sufficiently loose so that the user is able to remove and reposition them about strap 30 if desired. The gear hooks are preferably formed from a relatively lightweight but sturdy material, such as steel, aluminum or titanium. The hooks should be sufficiently strong to be able to support equipment being hung therefrom. For example, the gear hooks preferably support at least about 20 lbs. The gear hooks also preferably include a dull or camouflage finish.

Figure 9:
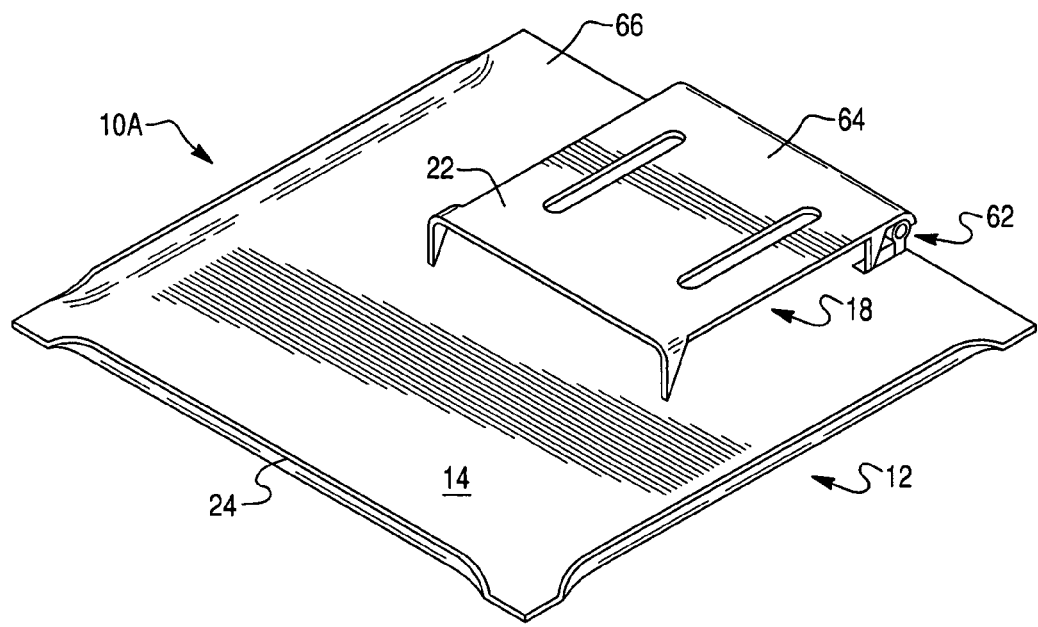
FIG. 9 is a perspective view of a tree shelf according to another embodiment showing the shelf surface and cleat in a closed position.
Figure 10:
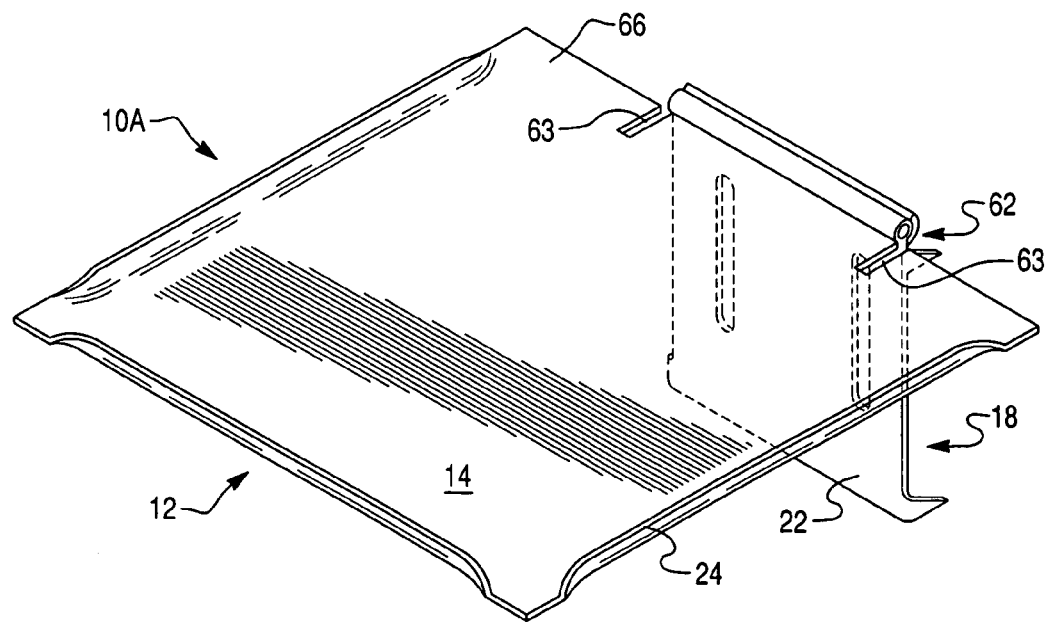
FIG. 10 is a perspective view of the tree shelf shown in FIG. 9 showing the shelf surface and cleat in an open position.

A tree shelf 10A according to a second embodiment is best shown in FIGS. 9 and 10. Some of the features of tree shelf 10A are identical to those features already discussed above, and are numbered accordingly. Tree shelf 10A includes shelf surface 12 and cleat 18. In addition, shelf 10A may include strap 30. However, cleat 18 is pivotally connected to shelf surface 12 via a hinge 62. Preferably, a first end 64 of cleat 18 is pivotally connected to a first end 66 of shelf surface 12.

Hinge 62 preferably opens through a maximum arc of 270°, so that cleat 18 is substantially perpendicular to shelf surface 12 when hinge 62 is in an "open position", as best shown in FIG. 10. Hinge 62 may be closed so that first surface 20 (shown in FIG. 2) of cleat 18 pivots toward first surface 14 of shelf surface 12, as best shown in FIG. 9. Cleat 18 is moved from the open position to the closed position by pivoting second surface 22 of cleat 18 away from second surface 16 (shown in FIG. 2) of shelf surface 12, and first surface 20 of cleat 18 toward and against first surface 14 of shelf surface 12.

Because barbs 34 extend outwardly from first surface 20 of cleat 18, barbs 34 may be pivoted into first surface 14 of shelf surface 12. In this way, shelf surface 12 acts as a protective sheath for barbs 34 when tree shelf 10A is in the closed position. Depending on the configuration of hinge 62, and the length of barbs 34, cutout sections 63 may be provided which receive barbs 36 that are proximate first end 64 of cleat 18. Preferably, barbs 34 do not extend outwardly through cutout sections 63, when shelf 10A is in the closed position, such that barbs will snag or poke the user or other surfaces. This is advantageous when tree shelf 10A is not in use, or when the user is carrying tree shelf 10A. Thus, damage to tree shelf 10A or other equipment, or injury to the user from barbs 34, is minimized. Furthermore, the space required to transport or store tree shelf 10A is minimized by folding shelf surface 12 and cleat 18 together.

Hinge 62 may include a spring loaded mechanism so that cleat 18 is biased toward the open position when hinge 62 is opened to a predetermined arc. For example, once hinge 62 is opened through an arc of about 180°, the spring mechanism may exert a force sufficient to bias and maintain cleat 18 in the open position, so that cleat 18 'snaps' into the open position. In addition, the spring loaded mechanism of hinge 62 should exert sufficient force such that hinge 62 is not moved out of the open position if shelf surface 12 is unintentionally bumped by the user or some other object. However, the spring loaded mechanism should not exert an excessive amount of force such that a user cannot pivot cleat 18 back to the closed position when desired. Any conventional spring loaded hinge may be used as hinge 62, which is similar to self-closing spring loaded hinges used for cabinet doors. Preferably, hinge 62 is a multi-spring loaded hinge which biases into both "sprung open" and "sprung closed" positions. Such multi-spring loaded hinges are known in the art and available from many commercial spring manufacturers.

Alternatively, a locking mechanism, such as spring loaded latch, may be provided on second surface 22 proximate first end 64 of cleat 18, which cooperates with a catch on second surface 16 of shelf surface 12. When tree shelf 10A is in the open position, the latch snaps into place in the catch, thereby releasably locking cleat 18 and shelf surface 12 in the open position. The latch may be pushed out of the catch by the user, thereby releasing cleat 18 from shelf surface 12, when the user wishes to pivot cleat 18 back to the closed position.

A hook may also be secured to, or integrally formed with, cleat 18. However, any hook provided on cleat 18 preferably permits cleat 18 to fold against shelf surface 12 in the closed position, as described above.

Figure 11:
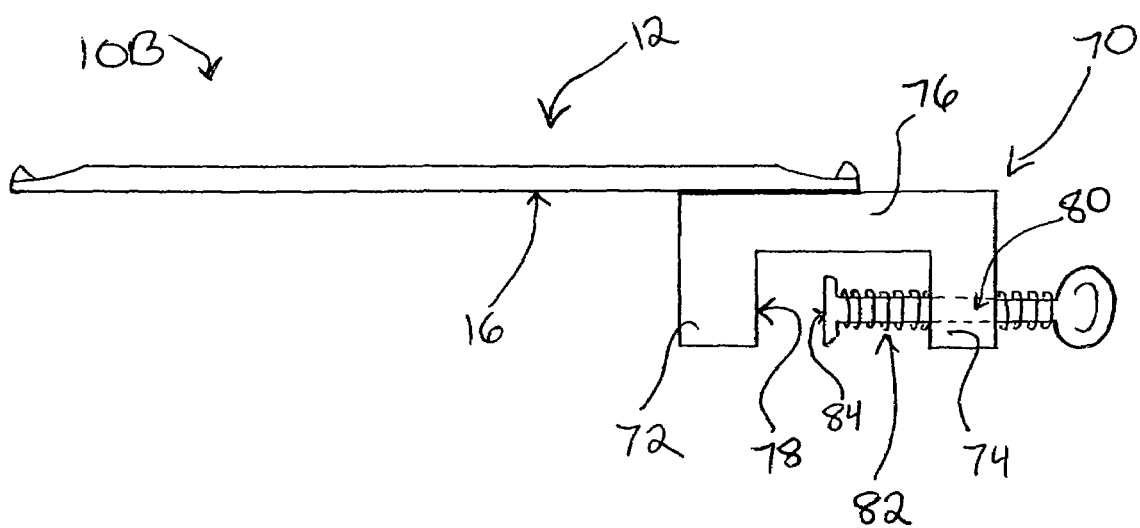
FIG. 11 is a perspective view of a tree shelf according to another embodiment.

A tree shelf 10B according to another embodiment is best shown in FIG. 11. Tree shelf 10B includes shelf surface 12, as described above. However, tree shelf 10B does not include cleat 18. Rather, a clamping device 70 is provided. Clamping device is preferably a C-clamp having a first end 72, a second end 74, and a central portion 76. First end 72 preferably includes a flattened surface 78. Second end 74 includes a threaded opening 80 extending therethrough. A threaded turn screw 82 is disposed within and cooperates with threaded opening 80, and may be screwed toward and away from flattened surface 78. Clamping device 70 is secured to second major surface 16 of shelf surface 12. Preferably, central portion 76 of clamping device 70 is secured to second major surface 16, so that turn screw 82 and flattened surface 78 are spaced from second major planar surface 16.

Tree shelf 10B may be secured to an object, such as a horizontally disposed support rod or framing of a portable hunting stand, by clamping the rod or framing between an end 84 of turn screw 82 and flattened surface 78. Tree shelf 10B is particularly well suited for attachment to the arm rail or upper portion of a ladder stand or tubing or framing of a portable stand. Although clamping device 70 may be secured to shelf surface 12 so that a portion of central portion 76 and second end 74 extend outwardly therefrom, as shown in FIG. 11, it should be understood that clamping device 70 may also be secured such that most or all of clamping device 70 is disposed within the periphery of shelf surface 12.

It will be apparent to one of ordinary skill in the art that various modifications and variations can be made in construction or configuration of the present invention without departing from the scope or spirit of the invention. For example, any locking mechanism or spring loaded hinge may be used to bias or releasably lock tree shelf 10A in the open position. In addition, various features from one of the embodiments may be incorporated into another of the embodiments. Thus, it is intended that the present invention cover all such modifications and variations.

I claim:

1. A portable shelf, comprising:
   a planer shelf surface;
   a cleat having first and second opposite major surfaces, said cleat having a first end pivotally connected to a rear edge of said shelf surface via a hinge and a distal second end, said hinge movable through an arc of about 270°;
   a plurality of barbs extending outwardly from said first major surface of said cleat, said cleat pivotally moveable between an open position and a closed position, said cleat substantially perpendicular to said shelf surface in said open position, and said barbs proximate said planar shelf surface in said closed position;
   a strap secured to said cleat, said strap having a first end releasably securable to a second end so that said strap forms a continuous loop for encircling a support post, said strap tightenable against the support post so that said barbs are forced into the support post thereby securing said cleat to the support post.

2. The portable shelf of claim 1, wherein said shelf surface includes first and second raised edges extending upwardly from first and second opposite side edges thereof.

3. The portable shelf of claim 2, wherein said shelf surface includes a third raised edge extending upwardly from a front edge thereof, said front edge opposite said rear edge.

4. The portable shelf of claim 1, wherein said shelf surface and said cleat are formed from a material selected from the group consisting of sheet metal. aluminum, steel, titanium, and a polymer material.

5. The portable shelf of claim 1, wherein said shelf surface has a substantially rectangular configuration.

6. The portable shelf of claim 1, wherein said cleat includes first and second spaced openings and a central portion therebetween, said strap extending through said first opening, across said central portion, and though said second opening, thereby slidably securing said cleat on said strap.

7. The portable shelf of claim 6, wherein said openings have a length greater than a width of said strap so that said strap may be angularly disposed within first and second openings relative to said shelf surface.

8. The portable shelf of claim 1, wherein said first and second ends of said strap are releasably securable together via a buckle.

9. The portable shelf of claim 1, wherein said cleat is substantially rectangular and includes four barbs extending outwardly from each corner of said cleat.

10. The portable shelf of claim 1, further comprising at least one hook having a first end securable to said strap, and a second portion configured for hanging equipment thereon.

11. A portable shelf comprising:
a planar shelf surface;
a cleat having first and second opposite major surfaces, said cleat having a first end pivotally connected to a rear edge of said shelf surface and a distal second end;
a plurality of barbs extending outwardly from said first major surface of said cleat, said cleat pivotally moveable between an open position and a closed position, said cleat substantially perpendicular to said shelf surface in said open position, and said barbs proximate said planar shelf surface in said closed position, wherein said shelf surface includes at least two cutout portions adjacent said rear edge, one of said barbs receivable in a corresponding one of said cutout portions when said cleat is in said closed position;
a strap secured to said cleat, said strap having a first end releasably securable to a second end so that said strap forms a continuous loop for encircling a support post, said strap tightenable against the support post so that said barbs are forced into the support post thereby securing said cleat to the support post.

12. The portable shelf of claim 11, wherein said shelf surface and said cleat are formed from a material selected from the group consisting of sheet metal, aluminum, steel, titanium, and a polymer material.

13. The portable shelf of claim 11, wherein said shelf surface has a substantially rectangular configuration.

14. The portable shelf of claim 11, wherein said shelf surface includes first and second raised edges extending upwardly from first and second opposite side edges thereof.

15. The portable shelf of claim 14, wherein said shelf surface includes a third raised edge extending upwardly from a front edge thereof, said front edge opposite said rear edge.

16. The portable shelf of claim 11, wherein said cleat includes first and second spaced openings and a central portion therebetween, said strap extending though said first opening, across said central portion, and though said second opening, thereby slidably securing said cleat on said strap.

17. The portable shelf of claim 16, wherein said openings have a length greater than a width of said strap so that said strap may be angularly disposed within first and second openings relative to said shelf surface.

18. The portable shelf of claim 11, wherein said first and second ends of said strap are releasably securable together via a buckle.

19. The portable shelf of claim 11, wherein said cleat is substantially rectangular and includes four barbs extending outwardly from each corner of said cleat.

20. The portable shelf of claim 11, further comprising at least one hook having a first end securable to said strap, and a second portion configured for hanging equipment thereon.

* * * * *